May 9, 1939.　　　　　G. INNES　　　　2,157,261
HAYMAKER MECHANISM
Filed June 21, 1937　　　3 Sheets-Sheet 3

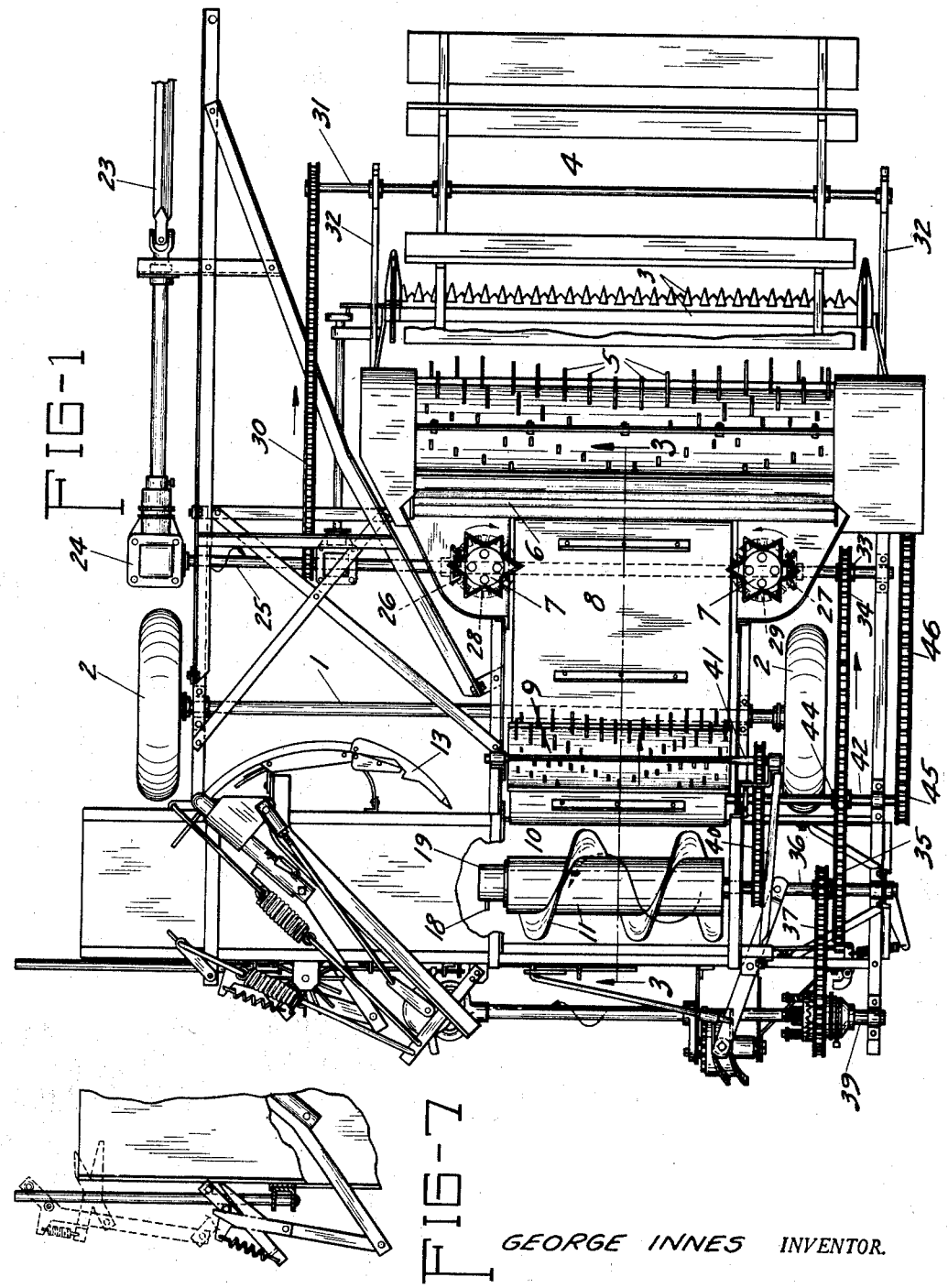

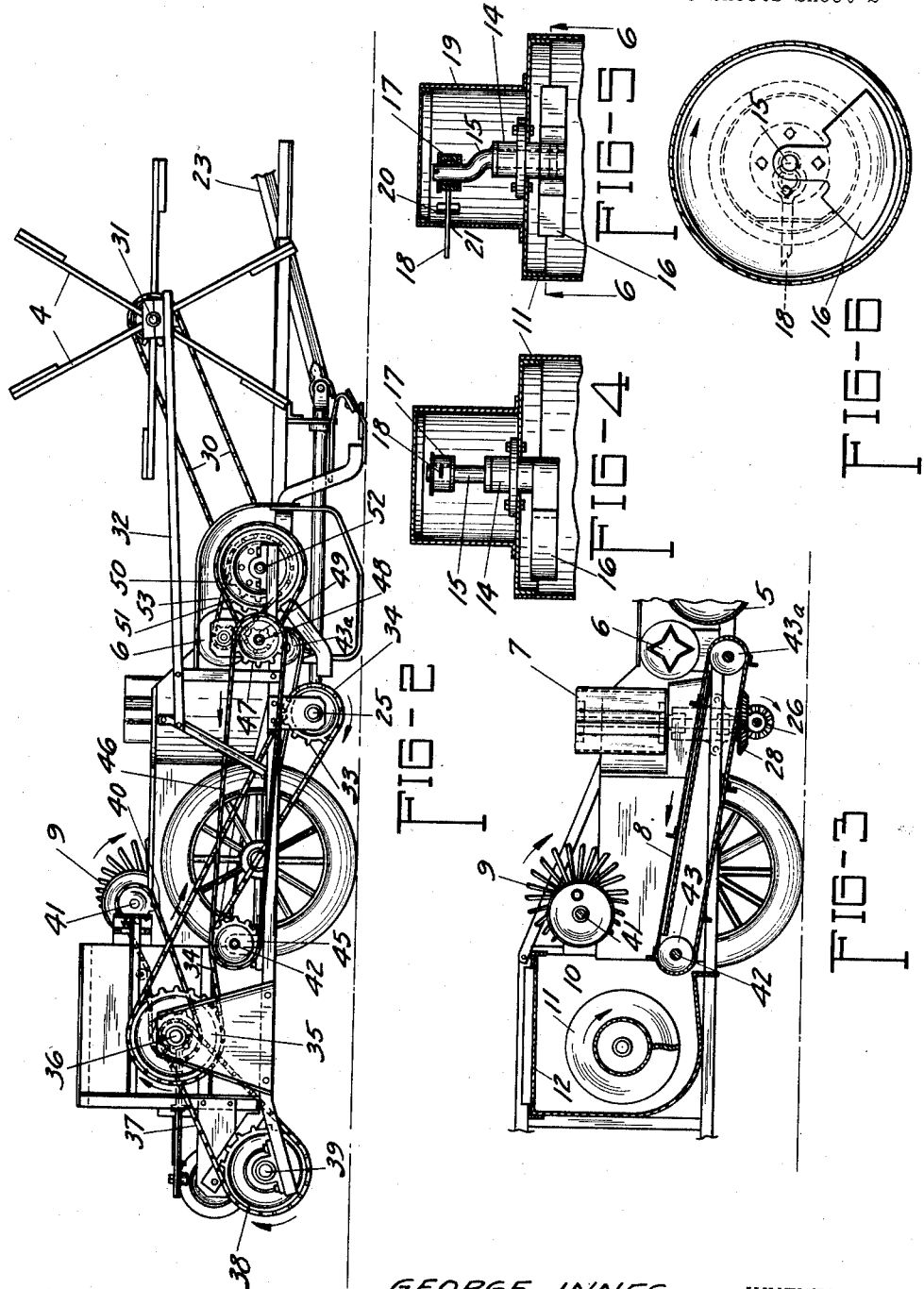

GEORGE INNES　INVENTOR.

BY Merrill M. Blackburn
ATTORNEY

Patented May 9, 1939

2,157,261

UNITED STATES PATENT OFFICE 2,157,261

HAYMAKER MECHANISM

George Innes, Davenport, Iowa, assignor to Innes Company, Bettendorf, Iowa, a corporation of Delaware Application June 21, 1937, Serial No. 149,351

5 Claims. (Cl. 56—182)

The present invention pertains to haymaking apparatus and more particularly to a machine for continuously cutting and baling hay without going through the customary step of permitting the hay to lie on the ground to dry. Among the objects of this invention are to provide an apparatus for the purpose indicated which will be light in weight but effective in operation; to provide an apparatus for the purpose indicated which can be manufactured and sold at a price within the reach of a majority of farmers; to provide a device for the purpose indicated which will be very effective in operation and will not require an extreme amount of cost for operation thereof; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof,

Fig. 1 represents a plan view of a machine constructed in accordance with my present invention;

Fig. 2 represents a side elevation of the structure shown in Fig. 1;

Fig. 3 represents a longitudinal section substantially along the plane indicated by the line 3—3, Fig. 1;

Figs. 4 and 5 represent, respectively, fragmentary vertical and horizontal sections longitudinally of the auger;

Fig. 7 represents a fragmentary plan view of a part of the structure shown in Fig. 1, with certain parts shown in different operative positions.

Fig. 8 represents a plan view of a somewhat modified form of this invention.

Figure 6:
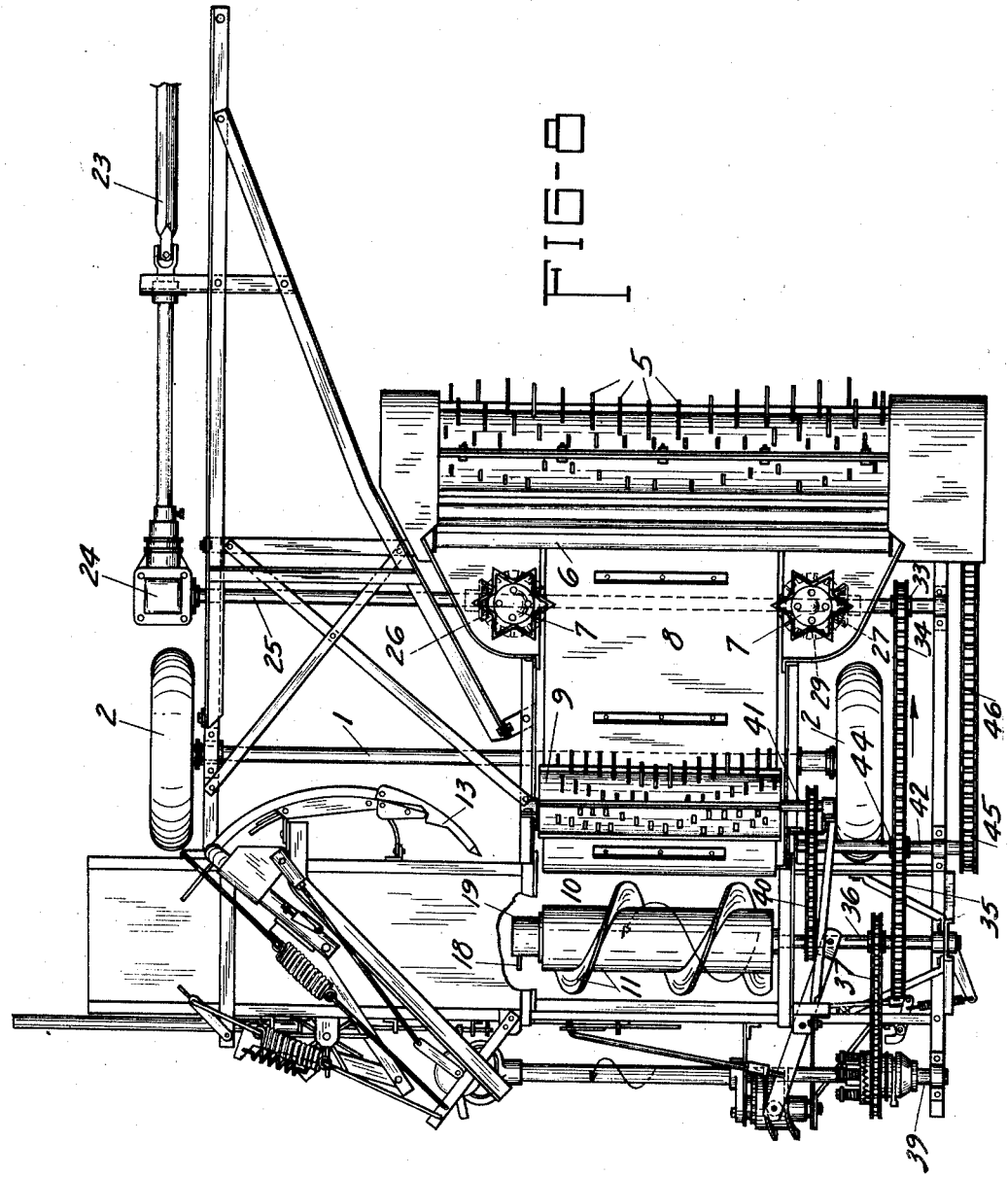
Fig. 6 represents a transverse section approximately along the plane indicated by the line 6—6, Fig. 5.

Reference will now be made in greater detail to the annexed drawings for a more complete disclosure of this invention. The main supporting shaft 1 connects and is supported by a pair of wheels 2. The machine frame is made up from suitable pieces, preferably of angle iron. At its forward portion, the machine carries a suitable cutter unit 3 comprising cutter bar and sickle, the latter being operated in any suitable manner and being shown in the drawings as being operated by the usual eccentric and pitman, familiar to those accustomed to the use of farm machinery. The machine also carries at its forward end, as is quite common, a reel 4 intended to prevent the cut grass from falling forwardly and to insure that it will be forced backwardly to be engaged by the pick-up 5. Back of the pick-up 5 is a beater 6, substantially coincident therewith in length. Back of the end portions of the beater 6 are located condensers 7. Between these condensers is located a suitable conveyor 8, preferably some type of conveyor belt.

Above the rear end portion of the conveyor 8 is a pick-up 9 which rotates in a direction to serve as a feeder and assists in forcing the cut grass into the auger chamber 10 in which is located the auger 11. The cover 12 of the chamber 10, shown in Fig. 3, is omitted in Fig. 1 for the sake of clearness. The auger 11 is both rotatable and reciprocable, as heretofore disclosed by me, the purpose being to force the straw forwardly into the baling chamber and compact it therein, ready for the tying operation which is carried out by the needle 13. In this baling mechanism there is a novel element not disclosed in any of my prior applications, and this element is shown in Figs. 4, 5, and 6.

Mounted upon the forward end of the auger 11 is a bearing 14 having therein a crank shaft 15, upon the inner end of which is rigidly secured a pendulum weight 16 which tends to keep the shaft in one position at all times, regardless of rotation of the auger. Upon the forward end of this crank shaft 15 is a bearing 17 from which projects a finger 18, as shown most clearly in Figs. 1 and 5. Surrounding the bearing 14 and shaft 15 is a cap or housing 19 which has an opening therethrough through which the finger 18 may reciprocate. A bracket 20 extends across the inside of the housing 19 and maintains the finger 18 in proper relationship to the hole through which it extends so that, as the housing rotates, the finger will be guided into the opening 21, at all times, as it reciprocates. As indicated above, the weight 16 holds the shaft 15 substantially stationary but permits it to turn, in event such should be necessitated, from any cause.

From the foregoing it will be seen that as the auger 11 rotates the finger 18 will be projected from one side of the housing 19, as shown in Fig. 1, and will be withdrawn into the housing before the completion of one hundred eighty degrees (180°) rotation by the auger. It has been found that in some cases there is a tendency for the grass to accumulate on one side of the bale, making the latter lopsided so that it is given a tendency to buckle and drop out of the band which is tied around it by the tying mechanism. The use of the finger 18 tends to distribute the grass evenly throughout the circumference of the bale and thus to make a well-balanced bale which will not buckle.

It will be understood that this machine is designed to be drawn by a tractor and that power is taken from the tractor for the operation of the various mechanisms embodied herein. The power take-off shaft is shown at 23 and power is transmitted from this to a shaft 25 through suitable gears located in the box 24. On the shaft 25 are beveled gears 26 and 27 which cooperate with beveled gears 28 and 29 mounted on the shafts which carry the condensers 7. Also carried by the shaft 25 is a sprocket wheel over which runs the chain 30 which passes over a sprocket wheel on the end of shaft 31 constituting a part of the reel 4. This reel shaft is supported by the arms 32 connected with the machine frame. From this it will be seen that the power is transmitted from shaft 23 through shaft 25 and chain 30 to the reel shaft 31 for operation of the reel 4.

Near the right hand end of the shaft 25 is a sprocket 33 which supports a chain 34, the purpose of which is to drive the auger 11, the conveyor 8, and the beater 6. The rear end of the chain 34 passes over a sprocket 35 secured to the auger shaft 36. The shaft 36 carries a sprocket wheel which supports one end of a chain 37, the other end of which is supported by a sprocket 38 on the clutch shaft 39. It is not necessary to go farther into the details of the clutch mechanism and the drive for the bale-tying mechanism as these are completely disclosed in my prior applications referred to above. Also, the mechanism for reciprocating the auger is more completely disclosed in applications previously filed by me.

A chain 40 connects the shafts 36 and 41 in driving relation by means of sprockets mounted on these respective shafts. The pick-up 9 is mounted on the shaft 41 and is actuated thereby so that it assists in forcing the hay into the auger compartment. A shaft 42 carries a roller 43 by means of which one end portion of the conveyor 8 is supported. The opposite end of the conveyor 8 passes over a roller 43a, shown in Figs. 2 and 3. A sprocket 44 is mounted on the shaft 42 and is driven by the chain 34, the lower strand of which engages and drives the sprocket. A sprocket 45 is mounted on the outer end of the shaft 42 and carries one end of a chain 46, the other end of which runs over a sprocket 47 carried by the shaft 48.

A small sprocket 49 is mounted on the shaft 48 and carries a chain 50 which passes over a large sprocket 51 carried by the shaft 52 of the pick-up 5. The shaft upon which the beater 6 is mounted carries a sprocket which is driven through a chain 53 which passes over a sprocket mounted on the shaft 52 (see Fig. 2).

Stated briefly, the operation is as follows: Power is transmitted through shaft 23 to shaft 25 and from this to the cutter 3 and reel 4. Power is also transmitted from shaft 25 to shaft 42 and from this to the conveyor 8, pick-up 5, and beater 6. Power is also taken from shaft 25 to operate the condensers 7 by which the hay is brought within the compass of the width of the conveyor 8. Power is transmitted from shaft 25 through chain 34 to shaft 36 and auger 11. Power is also taken off from shaft 36 to drive shaft 39 and the bale-tying mechanism. Power, furthermore, is taken off from shaft 36 and transmitted through chain 40 to pick-up 9. This completes the drive system for the various operative mechanisms of this construction, the operation of which will be obvious from the foregoing.

It will be seen from the foregoing that I have provided an entirely self-contained mechanism whereby grass may be cut and baled, as a continuous operation, so that much of the handling incident to haymaking, as ordinarily practiced, is avoided, as well as much loss which occurs during the handling of such crops as alfalfa. Also, the bales are put up in such form that there is a central opening therethrough which assists in the ventilation and curing of the central portion of the bale.

In this specification and the appended claims, the term "beaters" has not been used with its customary significance of a device for beating grain out of straw but to indicate a device for throwing cut grain or straw forwardly in its course of travel.

The word "belt" is used herein to include not only fabric and similar belts but also raddle rakes and the like.

The word "hay" as used herein is intended to include vegetable matter such as cut grass, straw, bean vines, kaffir and other corn stalks, and similar vegetation.

In the foregoing specification and the drawings annexed hereto, I have disclosed a complete machine for cutting and baling hay as a continuous operation but I desire it understood that parts thereof may be omitted and the structure used for picking up from the ground previously cut hay and baling it. For this purpose, the cutter 3 and reel 4 may be dispensed with. In Fig. 8, I have disclosed a machine embodying this invention with the reel and cutter bar omitted.

It will of course be understood that the specific description set forth above may be departed from without departing from the spirit of this invention as set forth in this specification and the appended claims.

Having now described my invention, I claim:

1. In a grain harvester having a gathering mechanism for vegetable matter and a conveyor for the gathered vegetable matter; the combination of a slinger for taking the vegetable matter from the gathering mechanisms and throwing it toward the conveyor, and spinners adjacent the two ends of the slinger to receive the vegetable matter from said two ends of the slinger and throw it toward the middle of the conveyor.

2. A structure as defined by claim 1 in which the lower ends of the spinners are located substantially above the conveyor.

3. A structure as defined by claim 1 in which the slinger and the lower ends of the spinners are placed a substantial distance above the conveyor.

4. In a grain harvester having a gathering mechanism for vegetable matter and a conveyor for said vegetable matter located back of the midportion of the gathering mechanism; the combination of spinners located adjacent the two sides of the conveyor at its forward end, and rotary means between the gathering mechanism and the spinners to receive the vegetable matter from the gathering mechanism and force it rearwardly, part of it into contact with the spinners, said spinners throwing the vegetable matter received thereby laterally toward the middle of the conveyor.

5. In a vegetable stalks gathering and processing mechanism, means for gathering vegetable stalks, said means extending transversely of the path of travel of the mechanism, and arranged to deliver vegetable stalks from its rear side substantially the full length thereof, endless conveyor means positioned angularly to the longitudinal extent of said gathering means at the rear side thereof and extending adjacent a portion only of said gathering means whereby the conveyor means receives vegetable stalks directly from that portion only of said gathering means, and a condensing spinner located adjacent to and rearwardly of a second portion of said gathering means, said second portion being adjacent to the first mentioned portion and said spinner being adjacent to said conveyor means whereby vegetable stalks delivered by said second portion of said gathering means to said spinner are delivered by said spinner to said conveyor means.

GEORGE INNES.